E. E. SHAW.

BEET HARVESTER.

APPLICATION FILED OCT. 1, 1909.

Reissued Mar. 7, 1911.

13,215.

3 SHEETS—SHEET 1.

Witnesses
Gerald Fenwy.
Henry T. Bright

Inventor
Edwin E. Shaw

By Chandler & Chandler.
Attorneys

THE NORRIS PETERS CO., WASHINGTON, D. C.

E. E. SHAW.

BEET HARVESTER.

APPLICATION FILED OCT. 1, 1909.

Reissued Mar. 7, 1911.

13,215.

3 SHEETS—SHEET 2.

Witnesses

Gerald Hussey.

Henry T. Bright

Inventor

Edwin E. Shaw.

By Chandler & Chandler

Attorneys

THE NORRIS PETERS CO., WASHINGTON, D. C.

E. E. SHAW.

BEET HARVESTER.

APPLICATION FILED OCT. 1, 1909.

Reissued Mar. 7, 1911.

13,215.

3 SHEETS—SHEET 3.

Witnesses

Gerald Hussey.

Henry T. Bright

Inventor

Edwin E. Shaw

By Chandlee & Chandlee

Attorneys.

THE NORRIS PETERS CO., WASHINGTON, D. C.

UNITED STATES PATENT OFFICE.

EDWIN E. SHAW, OF ITHACA, MICHIGAN.

BEET-HARVESTER.

13,215. Specification of Reissued Letters Patent. Reissued Mar. 7, 1911.

Original No. 874,800, dated December 24, 1907, Serial No. 334,469. Application for reissue filed October 1, 1909. Serial No. 520,594.

*To all whom it may concern:*

Be it known that I, EDWIN E. SHAW, a citizen of the United States, residing at Ithaca, in the county of Gratiot, State of Michigan, have invented certain new and useful Improvements in Beet-Harvesters; and I do hereby declare the following to be a full, clear, and exact description of the invention, such as will enable others skilled in the art to which it appertains to make and use the same.

This invention relates to beet harvesters and has for its object to provide a novel construction of implement of this class which will operate effectually to not only dig the beets from the ground but also to clean them.

One of the features of the invention resides in the provision of a blade standard of such construction that it may be reversed when one of its cutting edges becomes dull or worn and it is desired to continue using the implement.

A further feature of the invention lies in the fact that the slotted or kerfed mold-board is employed in connection with the implement, the soil being permitted to drop through the said kerf in the mold-board during the passage of the beets thereover.

Figure 1:
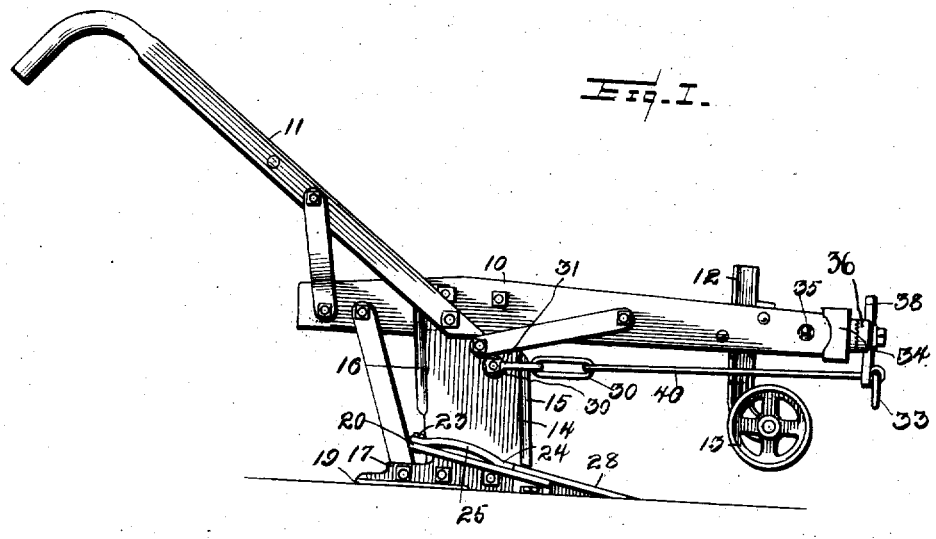
Figure 2:
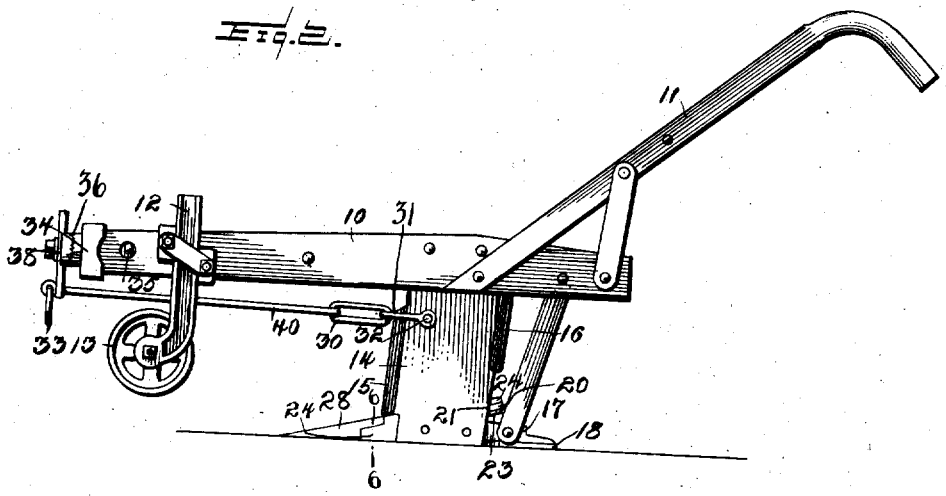
Figure 3:
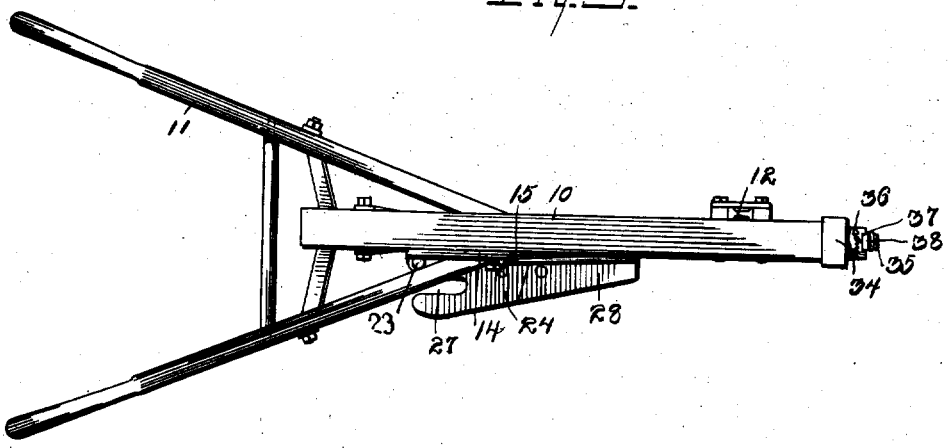
Figure 4:
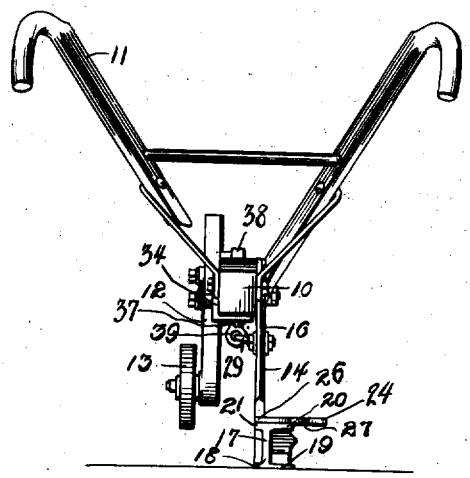
Figure 5:
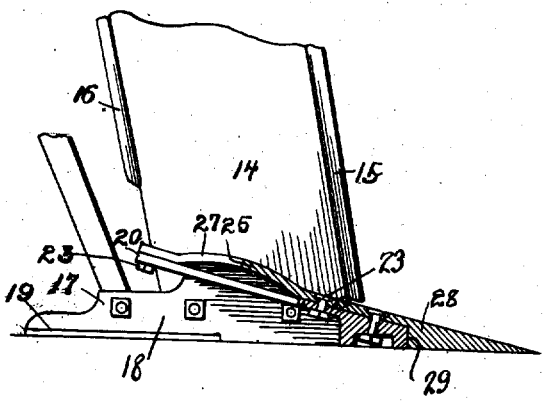
Figure 6:
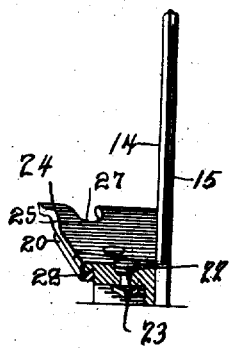
Figure 7:
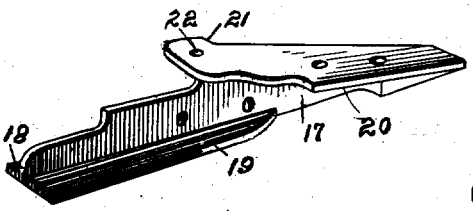
Figure 8:
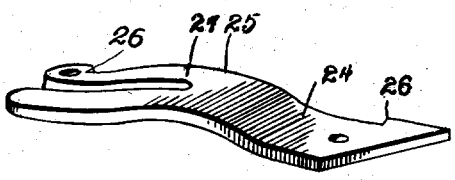

In the accompanying drawings, Figure 1 is a side elevation of the implement. Fig. 2 is a similar view of the opposite side thereof. Fig. 3 is a top plan view of the same. Fig. 4 is a rear elevation. Fig. 5 is a detail vertical longitudinal sectional view through the working portion of the implement. Fig. 6 is a transverse vertical sectional view on the line 6—6 of Fig. 2. Fig. 7 is a detail view of the foot of the implement. Fig. 8 is a detail perspective view of the mold-board of the implement.

The numeral 10 denotes the beam of the implement and 11 the handles thereof. Adjacent its forward end, the beam is provided with the usual gage wheel standard 12 which is adjustably secured to the beam and which carries the usual gage wheel 13. Bolted or otherwise secured at its upper end to the beam 10 is a blade standard 14 which has its forward edge sharpened to form a cutting edge 15, the said cutting edge of the standard extending from a point adjacent its lower end to a point a short distance below the beam 10, and the said blade standard has its rear edge provided with a similar cutting edge 16 which extends from a point adjacent the upper edge of the blade standard to a point slightly below the middle thereof, it being understood that when one edge becomes dulled the said blade standard may be inverted and reversed to present its opposite cutting edge in the direction of movement of the implement.

The numeral 17 denotes the foot of the implement and the said foot comprises a web portion 18 by means of which the same may be bolted to the lower end of the blade standard 14. Along the rear portion of its lower edge, the web plate 18 of the foot 17 is provided with a flange 19 which extends at right angles from the opposite sides of the said web portion and forms the runner of the foot. The upper edge of the web portion 18 is inclined upwardly and rearwardly and, as in the case of the lower edge, is provided with a flange 20, although this flange extends only to one side of the said plate. The extreme rear end, however, of the flange is turned laterally to extend slightly beyond the opposite side of the web plate and for the purpose of forming a shoulder 21 which seats against the rear edge of the blade standard 14. The said flange 20 is provided at points adjacent its front and rear ends with bolt openings 22 for the passage of bolts 23, which serve to secure upon the said flange portion of the foot the mold-board 24 of the implement. The said mold-board is curved upwardly and rearwardly and thence downwardly at its extreme rear end as at 25 and has its edge which abuts the adjacent side of the blade standard 14 shouldered as at 26 at each end for engagement with the front and rear edges of the said blade standard to brace the mold-board against longitudinal movement. For a purpose to be hereinafter described, the rear end portion of the mold-board is bifurcated or kerfed as at 27, the said kerf extending from the rear edge of the said board to the highest point of the board formed by the curvature 25 of the same.

The numeral 28 denotes a point which is bolted upon the forward end of the foot 17 and is provided with a shoulder 29 which the forward end of the said foot abuts. The rear edge of the point 28 contacts with the forward edge of the mold-board 24, this construction serving to mutually brace the said joint and mold-board.

By providing the mold-board 24 with a bifurcation or kerf, as described above, it will be seen that, as the beets pass over the said mold-board, any earth which may adhere to the beets will drop through the said kerf, and while this construction is not intended, nor does it presume, to entirely clean the beets of all earth which may adhere thereto, it will remove the greater part of the same.

The draft element for the implement comprises a rod 40 which is connected by means of a link 30 with a clevis 31, the said clevis being bolted as at 32 to the blade standard 14 of the implement adjacent its upper end, the said rod being provided at its forward end with a ring 33 for the connection of a swingle tree or the like. In order that the draft may be shifted to enable the implement to be used in soft or hard ground, a cap member 34 is arranged for the reception of the forward end of the beam of the implement and is secured in this position upon the beam by means of a bolt 35 which is engaged through the said cap member also through a disk 36 and the slot 37 in a plate 38, the opposing face of the disk 36 and a cap member 34 being provided with radial serrations by reason of which the disk may be held securely against the cap plate in any desired position to cause the plate 38 to lie at any desired angle. The forward end of the rod 40 is engaged through an opening 39 formed in the plate adjacent one of its ends and it will be readily understood that by varying the angle of inclination of the plate 38, the forward end of the rod will be correspondingly moved to vary the direction of the draft. I have found that very desirable results are obtained by taking the draft directly from the plate standard of the implement as above described.

It is to be understood that I do not desire to be limited to the exact details of construction shown and described, for obvious modifications will occur to a person skilled in the art.

What is claimed is:—

1. In a beet harvester, the combination with a beam and a standard secured thereto and depending therefrom, of a foot piece secured to the standard having its upper face located in a plane at right angles to the standard and inclined upwardly toward the rear of said standard, a cutting point secured to and projecting from the front end of the foot piece, and a mold-board supported upon the upper face of said foot piece, said mold-board comprising a plate having its terminal portions disposed flat upon the upper face of the foot piece and its intermediate portion arched, and further having a longitudinal recess opening through its rear end and extending partly through the arched portion thereof.

2. In a beet harvester of the type set forth, the combination with a longitudinal beam, and a standard fixed thereto and depending therefrom, of a foot-piece comprising a vertical web having horizontal lower flange, and the forwardly and downwardly inclined upper flange, fastening means for securing said web to said standard, a mold board formed at the ends of one of its sides with shoulders designed to engage said standard at the front and rear vertical edges thereof, said mold-board being imposed, and fixed upon said forwardly inclined flange, and having its front end terminating short of the front end of said foot-piece, and a point having its upper surface of the same inclination as the upper flange of said foot-piece, and being formed with a rearwardly projecting portion overlying said flange, and secured thereto, and with a shoulder abutting the end of said foot-piece.

In testimony whereof, I affix my signature, in presence of two witnesses.

EDWIN E. SHAW.

Witnesses:
JNO. T. MATHEW,
HENRY MCCORMACK.

Copies of this patent may be obtained for five cents each, by addressing the "Commissioner of Patents, Washington, D. C."